(12) United States Patent
Ifrah et al.

(10) Patent No.: US 11,964,255 B2
(45) Date of Patent: Apr. 23, 2024

(54) MIXED OXIDE WITH IMPROVED REDUCIBILITY

(71) Applicant: RHODIA OPERATIONS, Aubervilliers (FR)

(72) Inventors: Simon Ifrah, La Jarrie (FR); Laure Jeanne Simone Bisson, Paris (FR); Benjamin Faure, La Rochelle (FR); Rui Miguel Jorge Coelho Marques, Shangai (CN); Wei Li, Shanghai (CN); Ling Zhu, Licheng Town Liyang (CN)

(73) Assignee: RHODIA OPERATIONS, Aubervilliers (FR)

( * ) Notice: Subject to any disclaimer, the term of this patent is extended or adjusted under 35 U.S.C. 154(b) by 460 days.

(21) Appl. No.: 17/278,374

(22) PCT Filed: Sep. 23, 2019

(86) PCT No.: PCT/CN2019/107202
§ 371 (c)(1),
(2) Date: Mar. 22, 2021

(87) PCT Pub. No.: WO2020/063510
PCT Pub. Date: Apr. 2, 2020

(65) Prior Publication Data
US 2021/0354111 A1 Nov. 18, 2021

(30) Foreign Application Priority Data
Sep. 24, 2018 (WO) ................ PCT/CN2018/107177

(51) Int. Cl.
*B01J 21/04* (2006.01)
*B01J 6/00* (2006.01)
*B01J 21/06* (2006.01)
*B01J 21/08* (2006.01)
*B01J 21/12* (2006.01)
(Continued)

(52) U.S. Cl.
CPC ............. *B01J 21/066* (2013.01); *B01J 6/001* (2013.01); *B01J 23/464* (2013.01); *B01J 23/83* (2013.01); *B01J 35/002* (2013.01); *B01J 35/1014* (2013.01); *B01J 37/0201* (2013.01); *F01N 3/0835* (2013.01); *F01N 3/0842* (2013.01); *F01N 3/101* (2013.01)

(58) Field of Classification Search
CPC . B01J 21/04; B01J 21/06; B01J 21/063; B01J 21/066; B01J 21/08; B01J 21/12; B01J 23/16; B01J 23/10; B01J 23/464; B01J 23/745; B01J 23/83; B01J 23/8906; B01J 23/8933; B01J 23/894; B01J 35/002; B01J 35/1014; B01J 6/001; F01N 3/0835; F01N 3/0842; F01N 3/101
USPC ................ 502/302–304, 314, 316, 323, 327, 502/332–334, 336, 338, 339, 355
See application file for complete search history.

(56) References Cited

U.S. PATENT DOCUMENTS 6,248,688 B1 * 6/2001 Wu ...................... B01D 53/945
502/336
6,326,329 B1 * 12/2001 Nunan ..................... B01J 23/10
502/263
(Continued)

*Primary Examiner* — Cam N. Nguyen
(74) *Attorney, Agent, or Firm* — Osha Bergman Watanabe & Burton LLP

(57) ABSTRACT

Disclosed are a mixed oxide composition based on zirconium and cerium exhibiting a high reducibility, the process for preparing it and its use in the field of catalysis.

21 Claims, 1 Drawing Sheet

Figure 1:
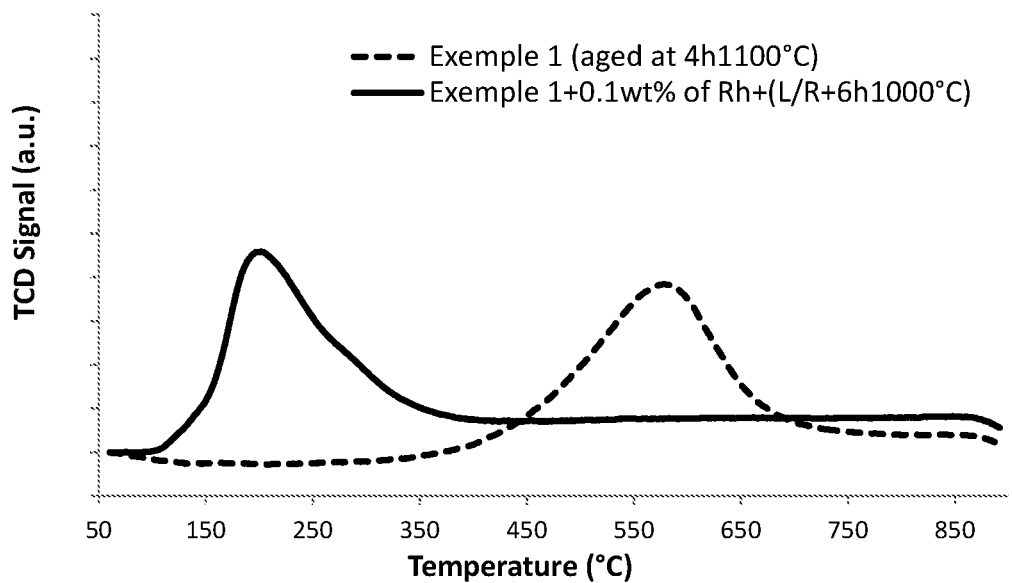

(51) Int. Cl.
  *B01J 21/16* (2006.01)
  *B01J 23/10* (2006.01)
  *B01J 23/46* (2006.01)
  *B01J 23/745* (2006.01)
  *B01J 23/83* (2006.01)
  *B01J 23/89* (2006.01)
  *B01J 35/00* (2006.01)
  *B01J 35/10* (2006.01)
  *B01J 37/02* (2006.01)
  *F01N 3/08* (2006.01)
  *F01N 3/10* (2006.01)

(56) References Cited

U.S. PATENT DOCUMENTS

| | | | | |
|---|---|---|---|---|
| 7,166,263 B2* | 1/2007 | Vanderspurt | .......... | C01F 17/241 |
| | | | | 502/302 |
| 7,390,436 B2* | 6/2008 | Kaneyoshi | .......... | C09K 11/676 |
| | | | | 252/301.4 P |
| 7,612,011 B2* | 11/2009 | Vanderspurt | ......... | C01G 27/006 |
| | | | | 502/302 |
| 7,871,957 B2* | 1/2011 | Willigan | ............... | C01G 25/006 |
| | | | | 423/247 |
| 9,376,327 B2* | 6/2016 | Morikawa | ............. | C04B 35/486 |
| 9,475,004 B2* | 10/2016 | Hatfield | ............. | B01D 53/9472 |
| 9,475,005 B2* | 10/2016 | Hatfield | .................... | B01J 23/63 |
| 9,539,542 B2* | 1/2017 | Mikita | .................... | B01D 53/94 |
| 9,962,684 B2* | 5/2018 | Hayashida | ........... | C01G 25/006 |
| 11,433,376 B2* | 9/2022 | Ocampo | .................... | B01J 37/031 |
| 11,613,473 B2* | 3/2023 | Harris | .................... | B01J 35/023 |
| | | | | 423/213.2 |
| 2006/0200691 A1* | 9/2006 | Yomo | .................... | G06F 9/4418 |
| | | | | 713/323 |
| 2014/0140910 A1* | 5/2014 | Ifrah | .................... | B01J 35/1014 |
| | | | | 423/213.2 |

* cited by examiner

MIXED OXIDE WITH IMPROVED REDUCIBILITY

The present application is a U.S. national phase entry under 35 U.S.C. § 371 of International Application No. PCT/CN2019/107202, filed on Sep. 23, 2019, which claims the priority of international patent application PCT/CN2018/107177 filed on Sep. 24, 2018. The entire contents of these applications are explicitly incorporated herein by this reference. In case of any incoherency between the present application and the PCT application that would affect the clarity of a term or expression, it should be made reference to the present application only.

The present invention relates to a mixed oxide composition based on zirconium and cerium exhibiting a high reducibility, to the process for preparing it and to its use in the field of catalysis.

FIELD OF THE INVENTION

"Multifunctional" catalysts are currently used for the treatment of exhaust gases from internal combustion engines (motor vehicle after-burning catalysis). The term "multifunctional" is understood to mean catalysts capable of carrying out not only oxidation, in particular of carbon monoxide and hydrocarbons present in exhaust gases, but also reduction, in particular of nitrogen oxides also present in these gases ("three-way" catalysts). Products based on cerium oxide, zirconium oxide and optionally one or more oxides of other rare-earth metals appear today as particularly important and advantageous constituents included in the composition of catalysts of this type. To be effective, these constituents must have a high specific surface area even after having been subjected to high temperatures, for example of at least 1100° C.

Another quality required for these catalyst constituents is the reducibility. The term "reducibility" means here, and for the rest of the description, the capacity of the catalyst to be reduced under a reductive atmosphere and to be reoxidized under an oxidizing atmosphere. The reducibility is linked to the amount of mobile oxygen for a given temperature range. Currently, the reducibility of catalysts is maximal at quite high temperatures on the above mentioned products. Now, there is a need for catalysts the reducibility of which is sufficient in lower temperature ranges. The improvement of the reducibility is also sought after both for the mixed oxide alone and for a catalyst composed of the mixed oxide and a Platinum Group Metal (or PGM).

In the current state of the art, it appears that the two characteristics mentioned above are often difficult to reconcile, i.e. high reducibility at a lower temperature has as a counterpart a rather low specific surface area.

The object of the invention is to provide a composition of this type which has in combination a high specific surface area and good reducibility at a lower temperature.

TECHNICAL BACKGROUND

WO 2013/004534 describes mixed oxides consisting essentially of zirconium and cerium exhibiting a high reducibility. The mixed oxides exhibit a specific surface area of at least 8 m$^2$/g, more particularly of at least 10 m$^2$/g, after calcination at 1100° C. for 4 hours. The mixed oxides disclosed in the examples exhibit a specific surface much lower than 25 m$^2$/g.

US 2009/0325793 describes mixed oxides comprising zirconium, cerium, lanthanum and iron, the content of iron being higher than 1.0% (e.g. content of iron oxide for the mixed oxide of example 2: 2.7%). There is also no mention of the specific surface area.

US 2017072386 describes mixed oxides comprising zirconium, cerium and iron with a low specific surface area (<2 m$^2$/g).

WO 2007/132253 describes mixed oxides with a low T$_{max}$. The mixed oxides contain tin but there is no mention of iron.

FIGURES

Figure 2:
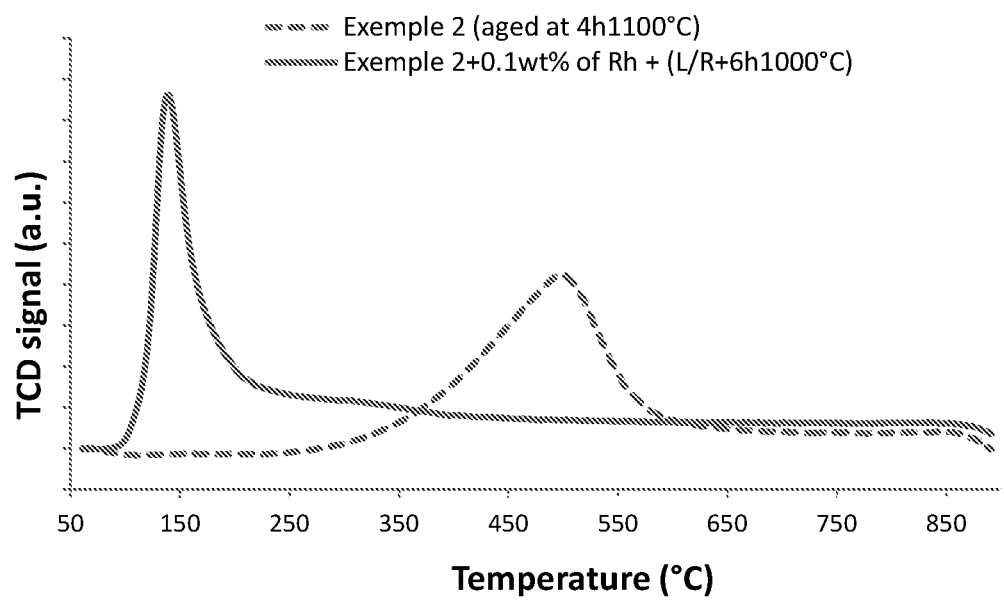

FIG. 1 discloses TPR curves of the following products:
mixed oxide of ex. 1 calcined in air at 1100° C. for 4 hours;
catalyst 1 corresponding to the mixed oxide of ex. 1 with 0.1% wt Rh aged in the "lean/rich" conditions A1-A2 disclosed in the examples.
FIG. 2 discloses TPR curves of the following products:
mixed oxide of ex. 2 calcined in air at 1100° C. for 4 hours;
catalyst 2 corresponding to the mixed oxide of ex. 2 with 0.1% wt Rh aged in the "lean/rich" conditions A1-A2.

DESCRIPTION

In the present application, the calcinations and especially the calcinations after which the surface area values are given are calcinations in air, unless otherwise mentioned. It is also specified, for the continuation of the description, that, unless otherwise indicated, in the ranges of values which are given, the values at the limits are included.

The present invention relates to a mixed oxide of zirconium, of cerium, of lanthanum, of iron, and optionally of at least one rare-earth element other than cerium and other than lanthanum (RE) with the following composition:
between 18.0 wt % and 45.0 wt % of cerium;
between 1.0 wt % and 15.0 wt % by weight of lanthanum;
up to 15.0 wt % of the rare earth element(s) (RE(s)) other than cerium and other than lanthanum;
between 0.05 wt % and 0.25 wt %, more particularly between 0.05 wt % and 0.20 wt %, even more particularly between 0.05 wt % and 0.15 wt %, of iron;
the remainder as zirconium;
exhibiting the following properties after calcination in air at 1100° C. for 4 hours:
a BET specific surface area of at least 25 m$^2$/g, more particularly of at least 26 m$^2$/g, more particularly of at least 28 m$^2$/g, even more particularly at least 30 m$^2$/g;
a maximum reducibility temperature (T$_{max}$) of at most 530° C., more particularly of at most 500° C.

The above mentioned elements are generally present in the mixed oxide as oxides. They may nonetheless be also partially present in the form of hydroxides or oxyhydroxides.

The mixed oxide of the invention may also comprise the element hafnium. Indeed, this element is usually present in combination with zirconium in the ores which are present in the natural state. The relative proportion of hafnium with respect to zirconium depends on the ore from which zirconium is extracted. The relative proportion by weight Zr/Hf in some ores may be around 50/1. Thus baddeleyite contains roughly 98 wt % of ZrO$_2$ and 2 wt % of HfO$_2$. As for zirconium, hafnium is generally present as an oxide. It is not excluded though that hafnium is also present partly in the form of an hydroxide or oxyhydroxide. The proportion of hafnium is lower or equal to 2.5 wt %, even lower or equal to 2.0 wt %.

As usual in the field of mixed oxides, the proportions of the elements are given by weight of oxide relative to the mixed oxide as a whole. For the calculations of these proportions, the following oxides are considered: $CeO_2$, $Fe_2O_3$, $ZrO_2$, $HfO_2$, $La_2O_3$, $RE_2O_3$ for all REs except for Pr for which $Pr_6O_{11}$ is considered. Thus, as an example, a proportion of 20.0 wt % of cerium means a proportion by weight of 20.0% of $CeO_2$ in the mixed oxide. The proportions of the elements are determined by the usual analytical methods like X-ray fluorescence or by Inductively Coupled Plasma Mass Spectrometry. It is also pointed out that, unless otherwise mentioned, in the ranges of values that are given, the limit values are included.

The mixed oxide of the invention comprises the above mentioned elements with the above mentioned proportions but it may also additionally comprise other elements like impurities. The impurities may stem from the raw materials or starting materials used in the process of preparation of the mixed oxide. The total proportion of the impurities may generally be lower than 0.2 wt % with respect to the mixed oxide.

The mixed oxide according to the invention is characterized first of all by the nature and proportions of its components. The proportion of cerium in the mixed oxide is between 18.0 wt % and 45.0 wt %, more particularly between 18.0 wt % and 42.0 wt %. The proportion of cerium may be between 18.0 wt % and 22.0 wt % or between 28.0 wt % and 32.0 wt % or between 38.0 wt % and 42.0 wt %.

The proportion of lanthanum in the mixed oxide is between 1.0 wt % and 15.0 wt %, more particularly between 3.0 wt % and 12.0 wt %. This proportion may be between 3.0 wt % and 7.0 wt %. This proportion may also be between 1.0 wt % and 7.0 wt %, more particularly between 1.0 wt % and 5.0 wt %.

The proportion of iron in the mixed oxide is between 0.05 wt % and 0.25 wt %, more particularly between 0.05 wt % and 0.20 wt %, even more particularly between 0.05 wt % and 0.15 wt %. The proportion of iron may also be between 0.10 wt % and 0.20 wt %, more particularly between 0.10 wt % and 0.15 wt %. According to an embodiment, the proportion of iron is strictly higher than 0.10 wt % (>0.10 wt %). Because of the proportion of iron oxide and the process used, iron oxide is well distributed within the mixed oxide. Also, XRD does not reveal any peak attributable to iron oxide.

The mixed oxide may also comprise at least one rare-earth element other than cerium and other than lanthanum. The rare-earth element(s) may be selected preferably in the group consisting of Nd, Y and Pr. Y and Pr are more particularly preferred.

The total proportion of the rare-earth element(s) other than cerium and other than lanthanum in the mixed oxide is up to 15.0 wt %. According to an embodiment, this total proportion may be up to 10.0 wt %, more particularly up to 7.0 wt %.

According to another embodiment, the total proportion of the rare-earth element(s) other than cerium and other than lanthanum in the mixed oxide may be at least 10.0 wt %, more particularly at least 12.0 wt %. This embodiment applies in particular when the proportion of iron is higher than 0.15 wt %, or even higher than 0.20 wt %. Pursuant to this other embodiment, the mixed oxide comprises yttrium with a proportion of at least 10.0 wt %, more particularly of at least 12.0 wt %.

Zirconium oxide constitutes the remainder of the composition. The proportion by weight of zirconium is as remainder to 100% of the other elements of the mixed oxide. The proportion of zirconium in the mixed oxide is at least 45.0 wt %, more particularly at least 49.0 wt %, even more particularly at least 50.0 wt %, even more particularly at least 54.0 wt % or at least 55.0 wt %. This proportion may be up to 77.0 wt % or up to 70.0 wt %.

A specific composition C1 according to the invention corresponds to the following composition:
- between 18.0 wt % and 22.0 wt % of cerium;
- between 3.0 wt % and 7.0 wt % of lanthanum;
- between 3.0 wt % and 7.0 wt % of yttrium;
- between 0.05 wt % and 0.25 wt %, more particularly between 0.05 wt % and 0.20 wt %, even more particularly between 0.05 wt % and 0.15 wt %, by weight of iron;
- the remainder as zirconium.

For composition C1, the proportion of zirconium may be between 64.0 wt % and 76.0 wt % by weight.

Another specific composition C2 according to the invention corresponds to the following composition:
- between 28.0 wt % and 32.0 wt % of cerium;
- between 3.0 wt % and 7.0 wt % of lanthanum;
- between 3.0 wt % and 7.0 wt % of yttrium;
- between 0.05 wt % and 0.25 wt %, more particularly between 0.05 wt % and 0.20 wt %, even more particularly between 0.05 wt % and 0.15 wt %, of iron;
- the remainder as zirconium.

For composition C2, the proportion of zirconium may be between 54.0 wt % and 66.0 wt % by weight.

Another specific composition C3 according to the invention corresponds to the following composition:
- between 38.0 wt % and 42.0 wt % of cerium;
- between 3.0 wt % and 6.0 wt % of lanthanum;
- between 3.0 wt % and 6.0 wt % of yttrium;
- between 0.05 wt % and 0.25 wt %, more particularly between 0.05 wt % and 0.20 wt %, even more particularly between 0.05 wt % and 0.15 wt %, of iron;
- the remainder as zirconium.

For composition C3, the proportion of zirconium may be between 46.0 wt % and 56.0 wt % by weight. According to an embodiment, for composition C3, the proportion of zirconium may be between 46.0 wt %, this latter value being excluded, and 56.0 wt % by weight.

For the three specific compositions C1-C3, all the remaining proportions being the same, the lanthanum content may also be between 1.0 wt % and 7.0 wt %, more particularly between 1.0 wt % and 5.0 wt %.

The mixed oxide of the invention is also characterized by a high specific surface area. The term "specific surface area (BET)" is understood to mean the BET specific surface area determined by nitrogen adsorption (BET: Brunauer-Emmett-Teller). This technique is well-known to the skilled person (see for instance, JACS 1938, 60, 309). The specific surface area may be obtained in accordance with the standard ASTM D3663-03 (Reapproved 2015). The specific surface area may be determined by the method disclosed in the examples.

The BET specific surface area of the mixed oxide may be at least 70 $m^2/g$, more particularly at least 75 $m^2/g$.

The BET specific surface area of the mixed oxide after calcination in air at 1100° C. for 4 hours is at least 25 $m^2/g$, more particularly of at least 26 $m^2/g$, more particularly of at least 28 $m^2/g$, even more particularly at least 30 $m^2/g$. This specific surface may be up to 40 $m^2/g$, more particularly up to 35 $m^2/g$, even more particularly up to 31 $m^2/g$. This specific surface area may be comprised between 25 and 40 m$^2$/g, more particularly between 26 and 40 m$^2$/g, more particularly between 28 and 40 m$^2$/g, even more particularly between 30 and 40 m$^2$/g. The specific surface area may also be comprised between 25 and 31 m$^2$/g.

After calcination in air at 1000° C. for 4 hours, the mixed oxide of the invention may also exhibit a BET specific surface area of at least 50 m$^2$/g, more particularly of at least 55 m$^2$/g, even more particularly of at least 60 m$^2$/g. This specific surface area may be comprised between 50 and 70 m$^2$/g, more particularly between 55 and 65 m$^2$/g. This specific surface area may be comprised between 60 and The mixed oxide of the invention is also characterized by an improved reducibility. The method used to characterize the reducibility is the Temperature Programmed Reduction (TPR). This technique of characterization of inorganic oxides is well-known to a person skilled in the art: see for instance the chapter "Thermal Methods" by Adrien Mekki-Berrada and Aline Auroux in Characterization of Solid Materials and Heterogeneous Catalysts, Vol. 1, Wiley, isbn 978-3-527-32687-7; or "Temperature Programmed Reduction and Sulphiding" by F. Kapteijn, J. A. Moulijn, A. Tafaoui in "An Integrated Approach to Homogeneous, Heterogeneous and Industrial Catalysis", Elsevier, 1993, isbn 978-0-080-88698-5.

$T_{max}$ and $V_{H2}$ are determined by TPR. The method to determine $T_{max}$ and $V_{H2}$ consists in measuring the consumption of hydrogen of the mixed oxide while it is being heated, as a function of temperature (consumption of $H_2$ vs. T). The hydrogen consumption is measured with a conductivity thermal detector (TCD) while the mixed oxide is heated from 50° C. to 900° C. with an increase ramp of 10° C./min under a reducing atmosphere composed of Ar (90.0 vol %) and $H_2$ (10.0 vol %). $T_{max}$ is defined as the temperature for which the intensity of the signal of the TCD is maximum on the TPR curve.

Examples of TPR curves are given in FIGS. 1 and 2. The TPR curves obtained give the intensity of the signal (y axis) of the TCD as a function of the temperature of the sample (x axis). On this regard, the raw signal of the TCD is negative, it is thus standard to plot the opposite of the raw signal so that the TPR curve contains at least one peak with a maximum value. $T_{max}$ corresponds to the temperature at which the uptake of hydrogen is maximal (peak on the TPR curve).

The measurement of $T_{max}$ and $V_{H2}$ can be performed with a Micromeritics Autochem 2920 machine.

After calcination in air at 1100° C. for 4 hours, the mixed oxide exhibits a maximum reducibility temperature ($T_{max}$) of at most 530° C., more particularly of at most 500° C. $T_{max}$ is generally at least 400° C., more particularly at least 460° C., even more particularly at least 490° C. $T_{max}$ may be comprised between 460° C. and 530° C., more particularly between 460° C. and 500° C., even more particularly between 490° C. and 530° C. $T_{max}$ may be comprised between 490° C. and 500° C. Generally speaking, the mixed oxide of the invention exhibits a single peak in the range 50° C.-550° C.

The method makes it also possible to determine the total consumption of hydrogen (or hydrogen uptake) between 200° C. and 800° C. (noted $V_{H2}$). $V_{H2}$ is calculated from the missing surface area of the hydrogen signal from the baseline. After calcination in air at 1100° C. for 4 hours, the mixed oxide of the invention may exhibit a total consumption of hydrogen of at least 17.0 mL/g mixed oxide. $V_{H2}$ may range from 17.0 to 25.0 mL/g. This volume is expressed in normal conditions (20° C.; 1 bar).

The mixed oxide of the invention may also be characterized by a total pore volume (TPV) which is between 0.20 and 0.40 mL/g, preferably between 0.30 and 0.40 mL/g, after calcination in air at 1000° C. for 4 hours. The total pore volume is measured by ordinary $N_2$ porosimetry. The measurement of TPV can be performed with a Tristar II 3020 machine. This fully automated machine makes it possible to obtain high-quality porosity measurements on solid materials by using the technique of $N_2$ adsorption.

The mixed oxide of the invention may also be characterized by a cubic or tetragonal crystallographic structure, preferably showing a unique phase. The crystal structure is measured by an ordinary X-Ray Diffraction technique.

The mixed oxide of the invention may be prepared by the process disclosed below which involves chlorides of Zr and Ce, NaOH as the base used for the precipitation and the addition of sulphate anion. With such process, it is possible to obtain a mixed oxide comprising a low amount of $SO_4^{2-}$, $Na^+$ and $Cl^-$ in the mixed oxide. The amount of Na in the mixed oxide may be lower than 150 ppm, more particularly lower than 100 ppm. This amount may be comprised between 10 ppm and 150 ppm, more particularly between 20 ppm and 150 ppm, even more particularly between 20 ppm and 100 ppm.

The amount of Cl in the mixed oxide may be lower than 100 ppm, more particularly lower than 50 ppm. This amount may be comprised between 1 ppm and 100 ppm, more particularly between 1 ppm and 50 ppm, even more particularly between 5 ppm and 50 ppm.

The amount of $SO_4^{2-}$ in the mixed oxide may be lower than 200 ppm, more particularly lower than 150 ppm, even more particularly lower than 100 ppm. This amount may be comprised between 5 ppm and 200 ppm, more particularly between 5 ppm and 150 ppm, even more particularly between 5 ppm and 100 ppm. The amounts of Na, Cl and sulphate are given by weight (ppm) and relative to the mixed oxide as a whole.

The invention more particularly relates to a mixed oxide consisting of or consisting essentially of a combination of the oxides of zirconium, of cerium, of lanthanum, of iron, optionally of at least one rare earth element other than cerium and lanthanum and optionally of hafnium, with the following composition:
- between 18.0 wt % and 45.0 wt % of cerium;
- between 1.0 wt % and 15.0 wt % of lanthanum;
- up to 15.0 wt % of the rare earth element(s) (RE(s)) other than cerium and lanthanum;
- between 0.05 wt % and 0.25 wt %, more particularly between 0.05 wt % and 0.20 wt %, even more particularly between 0.05 wt % and 0.15 wt %, of iron;
- between 0 and 2.5 wt %, more particularly between 0 and 2.0 wt %, of hafnium;
- the remainder as zirconium;

exhibiting the following properties after calcination in air at 1100° C. for 4 hours:
- a BET specific surface area of at least 25 m$^2$/g, more particularly of at least 26 m$^2$/g, more particularly of at least 28 m$^2$/g, even more particularly at least 30 m$^2$/g;
- a maximum reducibility temperature ($T_{max}$) of at most 530° C., more particularly of at most 500° C.

The expression "consisting essentially of" is to be interpreted as allowing the presence of other elements in addition to the mandatory elements, provided that the essential characteristics of the claimed composition are not materially affected by the presence of said other elements. All the technical features and embodiments previously disclosed also apply to this mixed oxide so disclosed, in particular for compositions C1, C2 and C3 disclosed above.

As regards the use of the mixed oxide according to the invention, this comes within the field of motor vehicle pollution control catalysis. The mixed oxide according to the invention may be used in the preparation of a catalytic converter, the role of which is to treat motor vehicle exhaust gases. The catalytic converter comprises a catalytically active coating layer prepared from the mixed oxide and deposited on a solid support. The role of the coating layer is to convert, by chemical reactions, certain pollutants of the exhaust gas, in particular carbon monoxide, unburnt hydrocarbons and nitrogen oxides, into products which are less harmful to the environment.

The chemical reactions involved may be the following ones:

$$2CO + O_2 \rightarrow 2\ CO_2$$

$$2NO + 2CO \rightarrow N_2 + 2CO_2$$

$$4C_xH_y + (4x+y)O_2 \rightarrow 4xCO_2 + 2yH_2O$$

The solid support can be a metal monolith, for example Fe-Cralloy, or be made of ceramic. The ceramic may be cordierite, silicon carbide, alumina titanate or mullite. A commonly used solid support consists of a monolith, generally cylindrical, comprising a multitude of small parallel channels having a porous wall. This type of support is often made of cordierite and exhibits a compromise between a high specific surface and a limited pressure drop.

The coating layer, commonly known as "washcoat", is deposited at the surface of the solid support. The coating layer is formed from a composition comprising the mixed oxide mixed with at least one mineral material. The mineral material can be selected in the group consisting of alumina, titanium oxide, cerium oxide, zirconium oxide, silica, spinels, zeolites, silicates, crystalline silico-aluminum phosphates and crystalline aluminum phosphates. The composition can also comprise other additives which are specific to each formulator: $H_2S$ scavenger, organic or inorganic modifier having the role of facilitating the coating, colloidal alumina, and the like. The coating layer thus comprises such a composition. Alumina is a commonly employed mineral material, it being possible for this alumina to optionally be doped, for example with an alkaline earth metal, such as barium. The coating layer also comprises at least one dispersed PGM, which is more particularly selected in the group consisting of Pt, Rh or Pd. The amount of PGM is generally between 1 and 400 g, with respect to the volume of the monolith, expressed in $ft^3$. The precious metal is catalytically active.

One method of dispersing the PGM and of preparing the catalyst consists in mixing an aqueous solution of a salt of the PGM and an aqueous suspension of the mixed oxide or of the mineral material or of the mixture formed of the mixed oxide and of the mineral material; drying the mixture to remove partly or totally the water and to calcine the solid in air. The salt can, for example, be a chloride or a nitrate of the precious metal (for example $Rh^{III}$ nitrate as in the examples). The water is removed from the suspension, in order to fix the precious metal, the solid is dried and it is calcined under air at a temperature generally of between 300° C. and 800° C. An example of preparation of a catalyst may be found in example 1 of U.S. Pat. No. 7,374,729.

The coating layer is obtained by the application of the suspension to the solid support. The coating layer thus exhibits a catalytic activity and can act as pollution-control catalyst. The pollution-control catalyst can be used to treat exhaust gases from internal combustion engines. The catalytic systems and the mixed oxides of the invention can finally be used as $NO_x$ traps or for promoting the reduction of $NO_x$, even in an oxidizing environment.

For this reason, the invention also relates to a process for the treatment of exhaust gases from internal combustion engines which is characterized in that use is made of a catalytic converter comprising a coating layer, which coating layer is as described above.

A particular advantage of the mixed oxide of the invention is that the dispersion of the PGM on the catalyst is well and homogeneously dispersed.

Process of Preparation of the Mixed Oxide of the Invention

The mixed oxide of the invention may be prepared by the following process which comprises the following steps:

(a1) an aqueous solution comprising sulphate anion ($SO_4^{2-}$), zirconium chloride salt and cerium (III) chloride is introduced into a stirred tank containing an aqueous basic solution of sodium hydroxide to form a precipitate;

(b1) an aqueous solution of iron (III) chloride and optionally at least one salt of a rare earth element (RE) other than cerium and lanthanum is then introduced into the stirred tank;

(c1) the precipitate obtained at the end of step (b1) is separated off from the liquid medium and repulped into water so as to decrease the amount of $SO_4^{2-}$, $Na^+$ and $Cl^-$;

(d1) the precipitate obtained at the end of step (c1) is heated in an aqueous medium;

(e1) a lanthanum salt is added to the suspension of the precipitate;

(f1) an organic texturing agent is added to the mixture obtained at the end of step (e1);

(g1) the solid material obtained at the end of step (e1) is separated off from the liquid medium and calcined in air.

In step (a1), an aqueous solution comprising sulphate anion ($SO_4^{2-}$), zirconium chloride salt and cerium (III) chloride (designated for simplicity as the CZR solution) is introduced into a tank containing an aqueous basic solution of sodium hydroxide to form a precipitate. The zirconium chloride salt may be $ZrOCl_2$.

The CZR solution comprises between 0.5 and 2.0 mole of sulphate anion ($SO_4^{2-}$) per mole of zirconium and cerium elements. This molar ratio $SO_4^{2-}/(Zr+Ce)$ is preferably in the range 0.7-1.5. Sulphate anions are conveniently provided by the addition of sulphuric acid.

The CZR solution can be degassed beforehand with an inert gas. This may be performed by circulating the inert gas above the aqueous solution or by injecting the inert gas into the CZR solution to reach saturation of the inert gas in the CZR solution. An "inert gas" is a gas which does not react with the reactants under the conditions used in the process. The inert gas may for instance be an oxygen-free atmosphere, like nitrogen or argon. The injection may consist in bubbling the inert gas into the CZR solution.

The amount of the NaOH in the basic solution is such that the pH of the basic solution is not lower than 7, and a preferred amount is such that the pH is between 7.0 and 11.0. The amount of NaOH is usually such there is a molar excess of basic compound over the Zr, Ce and RE(s). An aqueous solution of NaOH of around 10% wt may conveniently be used.

The reaction in step (a1) is preferably performed under an inert atmosphere, notably either in a closed reactor or in a semi-closed reactor. The bringing into contact is generally carried out in a stirred tank reactor. Step (a1) may be performed at a temperature comprised between 5° C. and 50° C.

In step (b1), an aqueous solution of iron chloride and optionally at least one salt of a rare earth element (RE) other than cerium and lanthanum is introduced into the tank. The salt of the RE may be for example a nitrate or a chloride, such as praseodymium nitrate, neodymium nitrate, yttrium (III) chloride ($YCl_3$) or yttrium nitrate ($Y(NO_3)_3$). The aqueous solution may also comprise one or several salts of the rare earth elements.

In step (c1), the precipitate obtained at the end of step (b1) is separated off from the liquid medium and repulped into water so as to decrease the amount of $SO_4^{2-}$, $Na^+$ and $Cl^-$. The separation may be performed, for example, with a Nutsche filter, by centrifuging or by decantation. The precipitate may optionally be washed with water. Washing is used to decrease the amount $SO_4^{2-}$, $Na^+$ and $Cl^-$ ions in the solid precipitate and consequently in the final mixed oxide. Further, the precipitate may optionally be dried, notably at a temperature comprised between 40° C. and 80° C.

In step (d1), the precipitate obtained at the end of step (c1) is heated in an aqueous medium. This thermal treatment consists in heating the medium and in maintaining it at a temperature which is generally comprised between 60° C. and 200° C., and more particularly between 95° C. and 150° C. The duration of this treatment may be between 1 hour and 4 hours. An example of thermal treatment is disclosed in the examples by which the suspension is aged at 97° C. for 1 hour. This treatment may also be carried out under an inert atmosphere, the description with respect to this atmosphere for the step (a) being applied similarly here. Similarly the treatment may be carried out in a stirred reactor. After the thermal treatment, the solid material may be washed with water. The washing may be performed in various ways with or without solid/liquid separation. It can thus be carried out by separating the solid particles from the liquid phase, for example by frontal filtration, settling out or centrifugation. The solid obtained is then resuspended in an aqueous phase. The process can also be carried out by tangential filtration. This washing can be optionally repeated if necessary, for example until a given conductivity of the suspension is obtained, whereby the conductivity measures the amount of impurities present in this suspension.

In step (e1), the lanthanum salt, notably in liquid or solid form, may be added to the mixture obtained at the end of step (d1). Lanthanum nitrate may conveniently be used.

In step (f1), an organic texturing agent is added to the mixture obtained at the end of step (e1). An organic texturing agent refers to an organic compound, such as a surfactant, able to control the porous structure, notably the mesoporous structure, of the mixed oxide. The term "mesoporous structure" refers to an inorganic structure comprising pores with a diameter comprised between 2 and 50 nm, described by the term "mesopores". The organic texturing agent may be added in the form of a solution or a suspension. The amount of the organic texturing agent, expressed as percentage by weight of additive relative to the weight of the mixed oxide obtained after the calcination step (g1), is generally between 5 and 100 wt % and more particularly between 15 and 60 wt %.

The organic texturing agent is preferably chosen in the group consisting of: anionic surfactants, nonionic surfactants, polyethylene glycols, carboxylic acids and their salts, and surfactants of the carboxymethylated fatty alcohol ethoxylate type. With regard to this additive, reference may be made to the teaching of application WO-98/45212 and the surfactants described in this document may be used. As surfactants of anionic type, mention may be made of ethoxycarboxylates, ethoxylated fatty acids, sarcosinates, phosphate esters, sulfates such as alcohol sulfates, alcohol ether sulfates and sulfated alkanolamide ethoxylates, and sulfonates such as sulfo-succinates, and alkylbenzene or alkylnapthalene sulfonates. As nonionic surfactants, mention may be made of acetylenic surfactants, alcohol ethoxylates, alkanolamides, amine oxides, ethoxylated alkanolamides, long-chain ethoxylated amines, copolymers of ethylene oxide/propylene oxide, sorbitan derivatives, ethylene glycol, propylene glycol, glycerol, polyglyceryl esters and ethoxylated derivatives thereof, alkylamines, alkylimidazolines, ethoxylated oils and alkylphenol ethoxylates. Mention may in particular be made of the products sold under the brands Igepal®, Dowanol®, Rhodamox® and Alkamide®. With regard to the carboxylic acids, it is in particular possible to use aliphatic monocarboxylic or dicarboxylic acids and, among these, more particularly saturated acids. Fatty acids and more particularly saturated fatty acids may also be used. Mention may thus in particular be made of formic acid, acetic acid, propionic acid, butyric acid, isobutyric acid, valeric acid, caproic acid, caprylic acid, capric acid, lauric acid, myristic acid and palmitic acid. As dicarboxylic acids, mention may be made of oxalic acid, malonic acid, succinic acid, glutaric acid, adipic acid, pimelic acid, suberic acid, azelaic acid and sebacic acid.

Salts of the carboxylic acids may also be used, in particular the ammonium. By way of example, mention may be made more particularly of lauric acid and ammonium laurate.

Finally, it is also possible to use a surfactant which is selected from those of the carboxymethylated fatty alcohol ethoxylate type. The expression "product of the carboxymethylated fatty alcohol ethoxylate type" is intended to mean products consisting of ethoxylated or propoxylated fatty alcohols comprising a $CH_2$—COOH group at the end of the chain.

These products may correspond to the formula:

$$R_1-O-(CR_2R_3-CR_4R_5-O)_n-CH_2-COOH$$

in which $R_1$ denotes a saturated or unsaturated carbon-based chain of which the length is generally at most 22 carbon atoms, preferably at least 12 carbon atoms; $R_2$, $R_3$, $R_4$ and $R_5$ may be identical and may represent hydrogen or else $R_2$ may represent an alkyl group such as a $CH_3$ group and $R_3$, $R_4$ and $R_5$ represent hydrogen; n is a non-zero integer that may be up to 50 and more particularly between 5 and 15, these values being included. It will be noted that a surfactant may consist of a mixture of products of the formula above for which $R_1$ may be saturated or unsaturated, respectively, or alternatively products comprising both —$CH_2$—$CH_2$—O— and —$C(CH_3)$—$CH_2$—O— groups.

In step (f1), the solid material obtained at the end of step (e1) is separated off from the liquid medium and calcined in air. The separation may be performed as for step (b1). The solid material may optionally be washed with an aqueous solution, preferably with water at basic pH, for example with an aqueous solution of ammonia. Further, the precipitate may optionally be dried to a suitable extent. The temperature of the may be comprised between 500° C. and 1200° C. The selection of the temperature may be made as desired, depending on the required values of the specific surface area and bulk density. The duration of the calcination may suitably be determined depending on the temperature, and may preferably be between 1 and 20 hours. Calcination may preferably be performed at a temperature comprised between 750° C. and 900° C.

The mixed oxide of the invention may more particularly be prepared by the recipes provided in examples 2 and 3 with adaptation of the nature and quantities of reactants. The invention also relates to a mixed oxide obtainable by the process disclosed above.

EXAMPLES

Specific Surface (BET)

The specific surface area is determined automatically on a Flowsorb II 2300. Prior to any measurement, the samples are carefully degassed to desorb the adsorbed species. To do so, the samples may be heated at 200° C. for 2 hours in a stove, then at 300° C. for 15 min in the cell of the appliance.

$N_2$ Porosimetry

The TPV is determined by $N_2$ porosimetry. An appliance Tristar II 3020 of Micromeritics is used following the recommendations of the constructor. BJH Method with Harkins & Jura isotherms is used.

TPR

The reducibility of a mixed oxide or of a catalyst is determined by measuring the consumption of hydrogen. The hydrogen consumption is measured with a conductivity thermal detector (TCD) while the sample is heated from 50° C. to 900° C. with an increase ramp of 10° C./min under a reducing atmosphere composed of Ar (90.0 vol %) and $H_2$ (10.0 vol %). The measurement is performed with a Micromeritics Autochem 2920 machine. The hydrogen uptake ($V_{H2}$) is calculated from the area missing from the hydrogen signal (from the TCD) to the baseline. $V_{H2}$ is determined for a temperature between 200° C. and 800° C. The baseline used for the TPR corresponds to the line of equation y=y0 for which y0 is the intensity of the signal at 50° C.

Preparation of Catalysts Comprising Rh (Content of Rhodium: 0.1 wt %)

The catalyst is prepared by the process comprising the following steps: wet impregnation of the mixed oxide with an aqueous solution of nitrate of rhodium; drying to remove partially or totally the water and calcination in air at 500° C. for 4 hours. Catalysts 1 and 2 correspond respectively to the impregnation of the mixed oxides of examples 1 (comparative with no iron) and 2 (invention).

The catalysts were then aged at 1000° C. for 6 hours in an atmosphere which is alternatively:
- an atmosphere A1 composed of 2.7 vol % $O_2$/10.0 vol % $H_2O$/the balance being $N_2$ and applied for 90 seconds; then
- an atmosphere A2 composed of 2.7 vol % CO/10.0 vol % $H_2O$/the balance being $N_2$ and applied for another 90 seconds;
- the cycle of the alternating atmosphere A1-A2 being repeated for the whole 6 hours of the aging.

Comparative Example 1: Mixed Oxide Prepared with a Process Involving No $FeCl_3$ This example aims at preparing a composition based on cerium, zirconium, lanthanum and yttrium with the following respective proportions of oxides of 40 wt %, 50 wt %, 5 wt %, 5 wt %. The preparation was performed in a reactor of approximately 300 liters equipped with a stirrer having inclined blades.

First an aqueous solution was prepared by mixing 42.8 L of deionized water (DIW) and 16.71 L of an aqueous solution of $CeCl_3$ ([Ce]=1.53 mol/L, d 1.33), to which were added 15.43 kg of an aqueous solution of $ZrOCl_2$ (36.2 wt % $ZrO_2$). To this solution, were added 37.25 L of an aqueous solution of $H_2SO_4$ (8.77 wt %; density 1.05).

After the addition of sulfuric acid, the solution was kept under mixing for 2 hours. The precipitation is triggered by transferring over 50 min the obtained aqueous solution in a precipitation tank preloaded with 100 L of an aqueous solution of NaOH (10.8% wt; density 1.099). The agitation speed during the precipitation was 220 rpm.

An aqueous solution of yttrium chloride of 1.7 mol/L containing the necessary amount for the targeted proportion of 5% $Y_2O_3$ in the final oxide was introduced rapidly into the precipitation tank.

Through filtration and repulping in water, the slurry was washed with water in order to decrease the amount of $SO_4^{2-}$, $Na^+$ and $Cl^-$ (below 200 ppm for each ion). After repulping in water at 100 g solid/L, the slurry was aged at 97° C. for 1 hour.

After ageing, an aqueous solution of lanthanum nitrate of 2.0 mol/L containing the necessary amount for the targeted proportion of 5% wt of $La_2O_3$ in the final oxide was introduced rapidly in the reaction mixture.

Then, 3.63 kg of lauric acid were added under stirring for 1 hour. The suspension was then filtered and the resulting cake was calcined in air at 800° C. for 3 hours to obtain the mixed oxide.

The mixed oxide obtained exhibits the following properties:
BET specific surface (1000° C./4 h)=61 $m^2/g$
BET specific surface (1100° C./4 h)=31 $m^2/g$
After calcination in air at 1100° C. for 4 hours: $T_{max}$=578° C.
After calcination in air at 1100° C. for 4 hours: $V_{H2}$=15.2 mL/g
TPV (1000° C./4 h)=0.24 mL/g Example 2: Mixed Oxide Prepared with the Process of the Invention This example aims at preparing a composition based on cerium, zirconium, lanthanum, yttrium and iron with the following respective proportions of oxides of 40 wt %, 49.9 wt %, 5 wt %, 5 wt %, 0.1 wt %, using the same equipments as Comparative Example 1.

First an aqueous solution was prepared by mixing 42.8 L of DIW and 16.71 L of an aqueous solution of $CeCl_3$ ([Ce]=1.53 mol/L, density 1.33), to which were added 15.40 kg of an aqueous solution of $ZrOCl_2$ (36.2 wt % $ZrO_2$). To this solution, were added 37.25 L of an aqueous solution of $H_2SO_4$ (8.77 wt %; d 1.05).

After the addition of sulfuric acid, the solution was kept under mixing for 2 hours. The precipitation is triggered by transferring over 50 min the obtained aqueous solution in a precipitation tank preloaded with 100 L of an aqueous solution of NaOH (10.8% wt; d 1.099). The agitation speed during the precipitation was 220 rpm.

An aqueous solution comprising yttrium chloride and iron(III) chloride of 1.7 mol/L containing the necessary amounts for the targeted proportion of 5 wt % $Y_2O_3$ and 0.1 wt % $Fe_2O_3$ in the final oxide was introduced rapidly into the precipitation tank.

Through filtration and repulping in water, the slurry was washed in order to decrease the amount of $SO_4^{2-}$, $Na^+$ and $Cl^-$ (below 200 ppm for each ion). After repulping in water at 100 g solid/L, the slurry was aged at 97° C. for 1 hour.

After ageing, an aqueous solution of lanthanum nitrate of 2.0 mol/L containing the necessary amount for the targeted proportion of 5 wt % of $La_2O_3$ in the final oxide was introduced rapidly in the reaction mixture.

Then, 3.63 kg of lauric acid were added under stirring for 1 hour. The suspension was then filtered and the resulting cake was calcined in air at 800° C. for 3 hours to obtain the mixed oxide.

The mixed oxide exhibits the following properties: proportion of Na: 91 ppm; proportion of Cl: <20 ppm; proportion of sulphate:
<150 ppm
BET specific surface (1000° C./4 h)=58 m$^2$/g
BET specific surface (1100° C./4 h)=26 m$^2$/g
After calcination in air at 1100° C. for 4 hours: $T_{max}$=498° C.
TPV (1000° C./4 h)=0.34 mL/g Example 3: Mixed Oxide Prepared with the Process of the Invention This example aims at preparing a composition based on cerium, zirconium, lanthanum and iron with the following respective proportions of oxides of 30 wt %, 59.9 wt %, 10 wt % and 0.1 wt %, using the same equipments as comparative Example 1.

First an aqueous solution was prepared by mixing 44.6 L of H$_2$O and 12.53 L of an aqueous solution of CeCl$_3$ ([Ce]=1.53 mol/L, density 1.33), to which were added 18.49 kg of an aqueous solution of ZrOCl$_2$ (36.2 wt % ZrO$_2$). To this solution, were added 38.55 L of an aqueous solution of H$_2$SO$_4$ (8.77 wt %; d 1.05).

After the addition of sulfuric acid, the solution was kept under mixing for 2 hours. The precipitation is triggered by transferring over 50 min the obtained aqueous solution in a precipitation tank preloaded with 100 L of an aqueous solution of NaOH (10.8% wt; d 1.099). The agitation speed during the precipitation was 220 rpm.

An aqueous solution comprising iron(III) chloride of 1.7 mol/L containing the necessary amounts for the targeted proportion of 0.1% Fe$_2$O$_3$ in the final oxide was introduced rapidly into the precipitation tank.

Through filtration and repulping in water, the slurry was washed in order to decrease the amount of SO$_4^{2-}$, Na$^+$ and Cl$^-$ (below 200 ppm for each ion). After repulping in water at 100 g solid/L, the slurry was aged at 97° C. for 1 hour.

After ageing, an aqueous solution of lanthanum nitrate of 2.0 mol/L containing the necessary amount for the targeted proportion of 10 wt % of La$_2$O$_3$ in the final oxide was introduced rapidly in the reaction mixture.

Then, 3.63 kg of lauric acid were added under stirring for 1 hour.

The suspension was then filtered and the resulting cake was calcined in air at 800° C. for 3 hours to obtain the mixed oxide.

The mixed oxide exhibits the following properties: proportion of Na: 50 ppm; proportion of Cl: <20 ppm; proportion of sulphate: <150 ppm
BET specific surface (1000° C./4 h)=45 m$^2$/g
BET specific surface (1100° C./4 h)=30 m$^2$/g
After calcination in air at 1100° C. for 4 hours: $T_{max}$=516° C.
After calcination in air at 1100° C. for 4 hours: $V_{H2}$=18.9 mL/g
TPV (1000° C./4 h)=0.27 mL/g As can be seen, the mixed oxides of examples 2 and 3 exhibit a lower $T_{max}$ (respectively $T_{max}$=498° C. and 516° C.) than the mixed oxide of comparative example 1 ($T_{max}$=578° C.). See also the dashed curves on FIGS. 1 and 2. For the mixed oxide of the invention, $T_{max} \leq 530°$ C., more particularly $T_{max} \leq 500°$ C.

Example 4: Ageing of the Catalysts

Catalysts 1 and 2 were aged in severe conditions (1000° C.; lean/rich conditions during 6 hours). As can be seen on the full curves of FIG. 1 and FIG. 2, the presence of Rh on the catalysts also lead to a lower $T_{max}$ and a higher consumption of H$_2$.

It may also be observed that the peak of consumption of H$_2$ is narrower for catalyst 2 (=Fe+Rh) comprising iron. This is the signature of well-dispersed Rh on homogeneous catalytic sites of the mixed oxide. This ensures a better adsorption of O$_2$ on the surface of the catalyst, so that the catalyst activity should be enhanced with faster and higher oxygen delivery.

Other examples of mixed oxides prepared according to the process disclosed are provided in Table I.

TABLE I

| | Composition (wt %)** | | | | | SSA * | $T_{max}$ * | $V_{H2}$ * |
|---|---|---|---|---|---|---|---|---|
| | Zr | Ce | La | RE | Fe | (m$^2$/g) | (° C.) | (mL/g) |
| 1 | 50.0 | 40.0 | 5.0 | Y 5.0 | / | 31 | 578 | 15.2 |
| 2 | 59.90 | 30.0 | 10.0 | / | 0.10 | 30 | 516 | 18.9 |
| 3 | 49.90 | 40.0 | 5.0 | Y 5.0 | 0.10 | 26 | 498 | |
| 4 | 49.95 | 40.0 | 5.0 | Y 5.0 | 0.05 | 34 | 526 | 16.5 |
| 5 | 49.85 | 40.0 | 5.0 | Y 5.0 | 0.10 | 30 | 486 | 16.8 |
| 6 | 67.90 | 22.0 | 2.0 | Nd 5.0; Y 3.0 | 0.10 | 25 | 520 | |
| 7 | 54.95 | 30.0 | 2.0 | Nd 5.0; Y 8.0 | 0.05 | 29 | 517 | |
| 8 | 54.90 | 30.0 | 2.0 | Nd 5.0; Y 8.0 | 0.10 | 27 | 496 | |
| 9 | 59.90 | 30.0 | 5.0 | Y 5.0 | 0.10 | 27 | 503 | |
| 10 | 49.925 | 40.0 | 5.0 | Y 5.0 | 0.075 | 28 | 507 | 19.6 |

* determined after calcination in air at 1100° C. for 4 hours
**compositions are given by weight of oxides (wt %)

The invention claimed is:

1. A mixed oxide comprising zirconium, cerium, lanthanum, iron, and optionally at least one rare-earth element other than cerium and lanthanum (RE), the mixed oxide having the composition:
   between 18.0 wt % and 45.0 wt % of cerium;
   between 1.0 wt % and 15.0 wt % of lanthanum;
   up to 15.0 wt % of the rare-earth element(s) (RE(s)) other than cerium and lanthanum;
   between 0.05 wt % and 0.25 wt % of iron;
   the remainder as zirconium;
   these proportions being given by weight of oxide relative to the mixed oxide as a whole, the mixed oxide exhibiting the following properties after calcination in air at 1100° C. for 4 hours:
   a BET specific surface area of at least 25 m$^2$/g;
   a maximum reducibility temperature ($T_{max}$) of at most 530° C.

2. The mixed oxide according to claim 1, further comprising hafnium.

3. The mixed oxide according to claim 2, wherein the proportion of hafnium is less than or equal to 2.5 wt %, this proportion being given by weight of oxide relative to the mixed oxide as a whole.

4. The mixed oxide according to claim 1, wherein the mixed oxide consists of or consists essentially of a combination of the oxides of zirconium, cerium, lanthanum, iron, optionally of at least one rare-earth element other than cerium and lanthanum, and optionally of hafnium, having the following composition:
- between 18.0 wt % and 45.0 wt % of cerium;
- between 1.0 wt % and 15.0 wt % of lanthanum;
- up to 15.0 wt % of the rare-earth element(s) (RE(s)) other than cerium and lanthanum;
- between 0.05 wt % and 0.25 wt % of iron;
- between 0 and 2.5 wt % of hafnium;
- the remainder as zirconium;
- these proportions being given by weight of oxide relative to the mixed oxide as a whole, the mixed oxide exhibiting the following properties after calcination in air at 1100° C. for 4 hours:
- a BET specific surface area of at least 25 m²/g;
- a maximum reducibility temperature ($T_{max}$) of at most 530° C.

5. The mixed oxide according to claim 1, wherein the elements Zr, Hf (if any), Ce, La, Fe and RE (if any) that constitute the mixed oxide are present in the mixed oxide as oxides or as oxides and also partially in the form of hydroxides or oxyhydroxides.

6. The mixed oxide according to claim 1, wherein the proportion of cerium is between 18.0 wt % and 42.0 wt %.

7. The mixed oxide according to claim 1, wherein the proportion of lanthanum is between 3.0 wt % and 12.0 wt %, or between 1.0 wt % and 7.0 wt %.

8. The mixed oxide according to claim 1, wherein the total proportion of the rare-earth element(s) other than cerium and other than lanthanum is up to 10.0 wt % or at least 10.0 wt %.

9. The mixed oxide according to claim 8, wherein the proportion of iron is greater than 0.15 wt %.

10. The mixed oxide according to claim 8, wherein the mixed oxide comprises yttrium with a proportion of at least 10.0 wt %.

11. The mixed oxide according to claim 1, wherein the mixed oxide has one of the following compositions C1-C3:
- composition C1
- between 18.0 wt % and 22.0 wt % of cerium;
- between 3.0 wt % and 7.0 wt % of lanthanum;
- between 3.0 wt % and 7.0 wt % of yttrium;
- between 0.05 wt % and 0.25 wt % of iron;
- the remainder as zirconium;
- composition C2
- between 28.0 wt % and 32.0 wt % of cerium;
- between 3.0 wt % and 7.0 wt % of lanthanum;
- between 3.0 wt % and 7.0 wt % of yttrium;
- between 0.05 wt % and 0.25 wt % of iron;
- the remainder as zirconium;
- composition C3
- between 38.0 wt % and 42.0 wt % of cerium;
- between 3.0 wt % and 7.0 wt % of lanthanum;
- between 3.0 wt % and 6.0 wt % of yttrium;
- between 0.05 wt % and 0.25 wt % of iron;
- the remainder as zirconium.

12. The mixed oxide according to claim 1, wherein the proportion of iron is between 0.10 wt % and 0.20 wt % or strictly greater than 0.10 wt % (>0.10 wt %).

13. The mixed oxide according to claim 1, wherein the proportion of zirconium is at least 45.0 wt %.

14. The mixed oxide according to claim 1, comprising an amount of Na in the mixed oxide less than 150 ppm, or an amount of Na in the mixed oxide comprised between 10 ppm and 150 ppm, this amount being given by weight (ppm) and relative to the mixed oxide as a whole.

15. The mixed oxide according to claim 1, comprising an amount of Cl in the mixed oxide lower than 100 ppm, or an amount of Cl in the mixed oxide comprised between 1 ppm and 100 ppm, this amount being given by weight (ppm) and relative to the mixed oxide as a whole.

16. The mixed oxide according to claim 1, wherein the mixed oxide exhibits after calcination in air at 1000° C. for 4 hours, a BET specific surface area of at least 50 m²/g, a total consumption of hydrogen ($V_{H2}$) of at least 17 mL/g mixed oxide, this volume being determined between 200° C. and 800° C., or a total pore volume (TPV) which is between 0.20 and 0.40 mL/g, the total pore volume being measured by $N_2$ porosimetry.

17. The mixed oxide according to claim 1, wherein $T_{max}$ is between 460° C. and 530° C.

18. The mixed oxide according to claim 1, wherein the mixed oxide exhibits a specific surface area which is at least 70 m²/g.

19. A composition comprising the mixed oxide according to claim 1 mixed with at least one mineral material.

20. The composition according to claim 19, wherein the mineral material is selected from the group consisting of alumina, titanium oxide, cerium oxide, zirconium oxide, silica, spinels, zeolites, silicates, crystalline silico-aluminum phosphates and crystalline aluminum phosphates.

21. A catalytic converter for treating motor vehicle exhaust gases comprising a catalytically active coating layer formed from a composition according to claim 19 and deposited on a solid support.

* * * * *